(12) United States Patent
Arcidiacono

(10) Patent No.: US 11,358,349 B2
(45) Date of Patent: Jun. 14, 2022

(54) METHOD OF MANUFACTURE OF A COMPOSITE MATERIAL

(71) Applicant: HEXCEL COMPOSITES LIMITED, Duxford (GB)

(72) Inventor: Marco Arcidiacono, Duxford (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 0 days.

(21) Appl. No.: 17/293,353

(22) PCT Filed: Nov. 8, 2019

(86) PCT No.: PCT/EP2019/080759
§ 371 (c)(1),
(2) Date: May 12, 2021

(87) PCT Pub. No.: WO2020/104221
PCT Pub. Date: May 28, 2020

(65) Prior Publication Data
US 2022/0009183 A1    Jan. 13, 2022

(30) Foreign Application Priority Data

Nov. 21, 2018    (GB) .................................... 1818937

(51) Int. Cl.
*B29C 70/54*    (2006.01)
*B29C 70/38*    (2006.01)
*B29K 307/04*    (2006.01)
*B29K 309/08*    (2006.01)
*B29L 31/08*    (2006.01)

(52) U.S. Cl.
CPC ............ *B29C 70/54* (2013.01); *B29C 70/386* (2013.01); *B29K 2307/04* (2013.01); *B29K 2309/08* (2013.01); *B29L 2031/085* (2013.01)

(58) Field of Classification Search
None
See application file for complete search history.

(56) References Cited

U.S. PATENT DOCUMENTS

| | | | |
|---|---|---|---|
| 4,824,507 A | 4/1989 | D'Amico | |
| 6,432,236 B1 * | 8/2002 | Leemon | B29C 66/9513 156/308.2 |
| 9,376,923 B2 * | 6/2016 | Bech | B23P 15/04 |
| 2014/0033653 A1 | 2/2014 | Cham et al. | |

FOREIGN PATENT DOCUMENTS

| | | |
|---|---|---|
| EP | 3045489 A1 | 7/2016 |
| WO | 02/32664 A1 | 4/2002 |
| WO | 2006/042251 A1 | 4/2006 |
| WO | 2018/088173 A1 | 5/2018 |

OTHER PUBLICATIONS

Search Report under Section 17(5), issued in the priority United Kingdom Patent Application No. GB1818937.3, dated May 22, 2019.
International Search Report (ISR) & Written Opinion (WO), issued in the parent Patent Cooperation Treaty (PCT), Application No. PCT/EP2019/080759, dated Feb. 20, 2020.

* cited by examiner

*Primary Examiner* — Jeffry H Aftergut
(74) *Attorney, Agent, or Firm* — W. Mark Bielawski

(57) ABSTRACT

A method of manufacture of a composite component is provided, the method comprising the steps of providing two layers of pre-preg composite material, one of which has an edge adjacent a surface of the other. Pressure and, optionally, vibrational energy is applied to the edge to thereby smooth the ply drop.

3 Claims, 11 Drawing Sheets

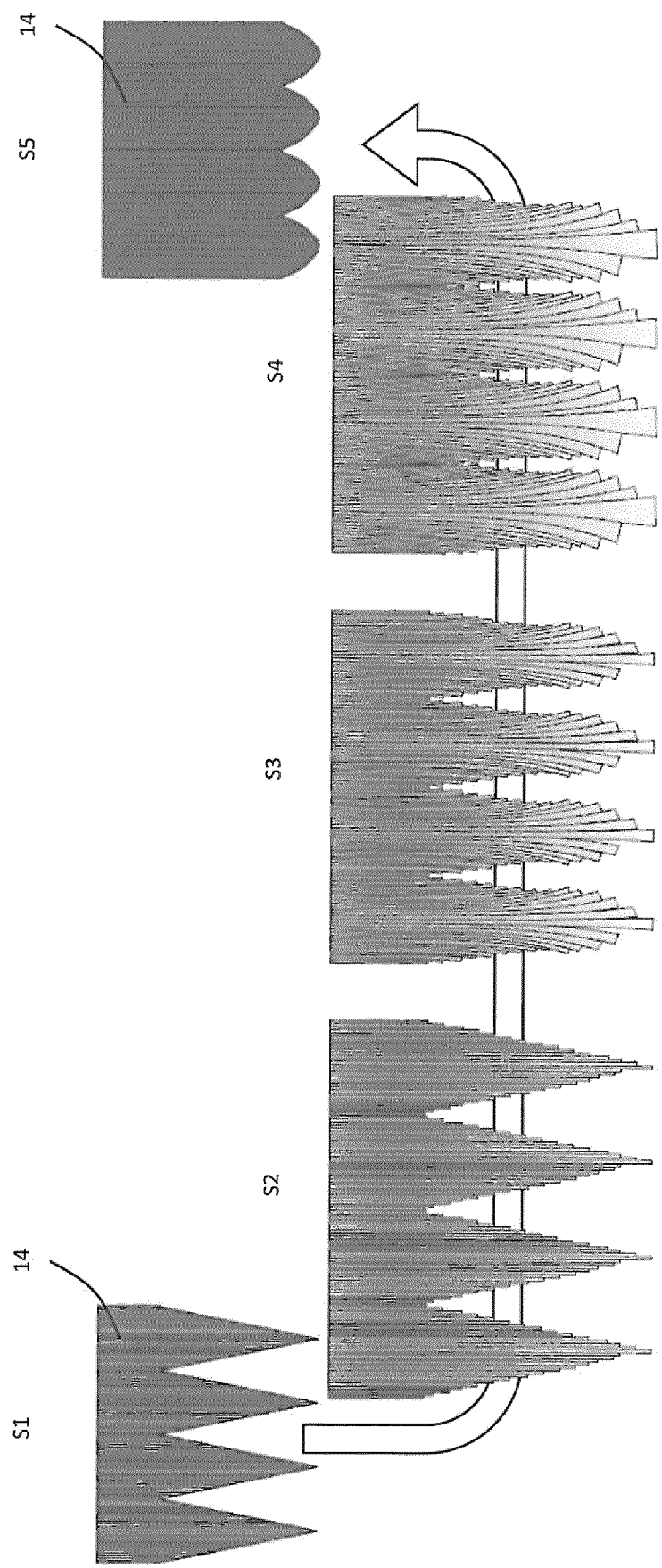

METHOD OF MANUFACTURE OF A COMPOSITE MATERIAL

The present invention relates to a method of manufacture of a composite component. Specifically, the present invention relates to a method of manufacture of a composite component constructed from multiple layers of pre-preg (pre-impregnated composite).

Pre-preg manufacture is a widely used technique in the manufacture of composite articles. Pre-pregs are widely used in e.g. aerospace, and for the construction of wind turbine blades. "Pre-pregs" comprise a layer of fibre reinforcement which has been impregnated with an uncured or partially cured matrix material. The term pre-preg also includes so-called semi-preg materials in which the matrix is bonded to the surface of the fibers of the reinforcement, but not so that the fibers are wet out, i.e. the matrix material is on the surface of the fibers and not fully dispersed throughout the reinforcement. The fibre may be selected from a wide range of materials, including carbon, glass, aramids or a combination of materials. The fibre may be woven or non-woven, and each layer of pre-preg may have various fibre sub-layers within. These sub-layers may be at the same orientation (unidirectional) or at different orientations (bi-axial, tri-axial, multi-axial or in the form of non-crimped fabric), e.g. 0/+45/−45/90 degrees. The matrix material is generally a polymer and may be a thermoset (e.g. epoxy) or a thermoplastic material.

Laying-up of multiple pre-preg layers can be time consuming. Automated processes are known in the art, such as ATL (automated tape layup) which speeds up the layup process. The critical constraint for layup is deposition rate (whether manual or automated). Ultimately, the manufacture of a composite component is dependent on the maximum speed at which the layers can be deposited. Therefore, it is generally desirable to use fewer, thicker layers. Use of fewer, thicker layers has been adopted in the construction of wind turbine blades for some time, but now the aerospace industry is looking to take on this approach to increase manufacturing efficiency.

A problem with any layup process, and the resulting component, is so-called "ply drop-off". This occurs at the edges of adjacent layers of vertically stacked but off-set composite materials; i.e. where one layer is located above another layer but the edge of the of the upper layer falls inside the surface of the lower layer. This abrupt change of cross section is known as a "drop-off". Currently, ply drop-off results in a step change in material thickness caused by the abrupt edge of one layer on another, producing a sharp corner in the surface of the pre-preg. This is problematic, not only aesthetically, but also mechanically as such a feature can cause undesirable stress concentrations in the component. The problem becomes exacerbated with thicker pre-preg layers, as the drop-off becomes more severe. Therefore, there is a tension between the need to use fewer, thicker layers to increase manufacturing efficiency on the one hand, and to reduce layer thickness to reduce the effects of ply drop-off on the other hand.

WO2013/007263 discloses forming stacks of fibrous layers having reduced thicknesses at the edges of the stacks by staggering the widths of the individual fibre layers.

It is an aim of the present invention to overcome, or at least mitigate, this problem and/or to provide improvements generally.

According to the present invention, there is provided a method and a composite material as detailed in any of the accompanying claims.

According to a first aspect of the invention there is provided a method of manufacture of a composite component comprising the steps of:
  providing a first layer of pre-preg composite material;
  providing a second layer of pre-preg composite material, the second layer having an edge;
  laying-up the first and second layers of pre-preg composite material such that the edge of the second layer is adjacent a surface of the first layer of pre-preg composite material; and
  applying pressure and, optionally, vibrational energy to the edge of the second layer to thereby smooth the ply drop at the edge of the second layer.

By the edge of the second layer being "adjacent a surface of the first layer" it is meant that the second layer is in contact with a surface of the first layer but that at least one edge of the second layer is displaced from any edge of the first layer, so that a step is formed between the upper surface of the second layer and the upper surface of the first layer.

Smoothing the ply drop at the edge of the second layer means that the sharp, vertical drop-off at the edge of the layer is converted to a gradual, generally smooth slope, and that the initial 90° angle between the edge of the second layer and the surface of the first layer is reduced, preferably to less than 45°, more preferably to from 10 to 30°.

The pressure and any vibrational energy applied to the second layer of pre-preg composite material may be applied directly to the layer or may be applied via an intervening layer, such as a removable sheet of siliconized paper.

In a particular embodiment of the method of the invention the step of applying pressure and, optionally, vibrational energy to the edge of the second layer is carried out at a first position; and the method comprises a further step of applying pressure and, optionally, vibrational energy to the second layer at a second position, the second position being offset in a direction normal to the edge of the second layer with respect to the first position.

The pressure applied to the edge of the second layer of pre-preg composite material in order to smooth the ply drop will depend upon a number of factors, including the nature and thickness of the material and whether or not vibrational energy is also applied. In the absence of vibrational energy very high pressures may be necessary; however, particularly when vibrational energy is also applied, the pressure is preferably more than or equal to 20 kPa and/or less than or equal to 500 kPa. More preferably, the pressure is from 20 to 200 KPa, even more preferably from 50 to 150 kPa.

In a preferred embodiment of the method of the invention both pressure and vibrational energy are applied to the edge of the second layer of pre-preg composite material. The pressure and vibrational energy may be applied separately, but are preferably applied simultaneously. Applying both pressure and vibrational energy when smoothing the edge of the second layer of pre-preg composite material, particularly applying both simultaneously, is particularly advantageous as it generates a very concentrated form of energy which is capable of displacing fibres within the composite material, thereby providing maximal smoothing with reduced resin displacement. Any form of vibrational energy may be applied, but, preferably, the vibrational energy is ultrasonic energy. Suitably, pressure and ultrasonic energy may be applied to the edge of the second layer of pre-preg composite material simultaneously by means of an ultrasonic transducer, or sonotrode, for example as the ultrasonic transducer is moved along the edge of the second layer. In a particular embodiment, the method of the present invention may include depositing the second layer onto the first layer using an automated pre-preg laying apparatus, and following the automated pre-preg laying apparatus with an ultrasonic transducer.

The vibrational energy applied to the edge of the second layer of pre-preg composite material in order to smooth the ply drop in the method of the present invention will depend upon a number of factors, including the nature and thickness of the material, the amount of pressure also applied, and the form of the vibrational energy. Preferably however, when the vibrational energy is in the form of ultrasonic energy the energy applied to the edge is more than or equal to 20 kW/m$^2$ and/or less than or equal to 500 kW/m$^2$. More preferably, the ultrasonic energy is from 50 to 300 kW/m$^2$. The value of the energy applied is calculated as the energy input over the application area in the application time.

In a preferred embodiment of the method of the present invention the edge of the second layer of pre-preg composite material defines an undulating formation. Advantageously, the provision of an undulating formation allows the fibres of the second layer of pre-preg composite material to "spread" upon the application of the force and any vibrational energy, causing the thickness of the material in that area to taper instead of being an otherwise severe "step".

By an undulating formation it is meant that the edge of the composite material is not linear but is shaped; for example the edge may comprise a plurality of protrusions. The protrusions of the undulating formation may be irregularly shaped and/or irregularly spaced, but preferably they are regularly shaped and regularly spaced. The protrusions may be any suitable shape to promote fibre spreading, such as triangular or curved—for example sinusoidal or formed as a series of alternating and adjacent circle-segments. The protrusions of the undulating formation need not be adjacent, there may be flat edge portions between each protrusion, but in preferred embodiments of the method of the invention the plurality of the protrusions are adjacent. It is also preferred that the protrusions are triangular or have curved edges. In embodiments of the invention in which the protrusions are triangular, the triangles preferably have a height of from 5 to 100 mm and a base of from 1 to 100 mm, more preferably a height of from 10 to 50 mm and a base of from 2 to 20 mm.

The method of the present invention is suitable to smooth ply drop associated with the laying up of any pre-preg composite material, however it is particularly suitable for smoothing the ply drop produced by laying up relatively thick materials. In preferred embodiments of the present invention the second layer of pre-preg composite material has a thickness of from 0.2 to 20 mm, preferably from 0.25 to 10 mm or from 0.25 to 5 mm.

Similarly, the method of the present invention may be used when laying up pre-preg composite materials comprising any arrangement of fibres, including materials in which the fibres are unidirectional, multi-axial or in the form of a non-crimped fabric.

The method of the present invention may also be used when laying up pre-preg composite materials comprising any types of fibres such as carbon, glass, aramids or a combination of materials; however, the method of the invention is particularly suitable for use when laying up pre-preg composite materials comprising carbon or glass fibres.

The method of the present invention is particularly suitable for laying up multiple layers of pre-preg composite materials and smoothing the ply drop associated with each layer. In a particular aspect of the invention the method of the invention may therefore further comprise the steps of:

providing one or more additional layers of pre-preg composite material, each additional layer having an edge;

laying-up one of the additional layers of pre-preg composite material such that the edge of the additional layer is adjacent to a surface of the second layer of pre-preg composite material;

applying pressure and, optionally, vibrational energy to the edge of the additional layer to thereby smooth the ply drop at the edge of the additional layer; and repeating the laying up and application of pressure and, optionally, vibrational energy for each additional layer of pre-preg composite material.

In an alternative embodiment of this aspect of the invention, multiple layers of pre-preg composite materials may be laid up before pressure and, optionally, vibrational energy is applied to smooth the associated ply drops. In this embodiment, if the edges are relatively close together, the pressure and optional vibrational energy may be applied to each of the edges simultaneously, for example by a single transducer head large enough to overlap each of the edges. Alternatively, if the edges are sufficiently widely spaced, the pressure and optional vibrational energy may be applied to each of the edges separately, for example by a single transducer head moving sequentially from one edge to another or by multiple transducer heads.

The method of the present invention may also include the step of curing the laid up materials after smoothing of the ply drops, and any curing method suitable for curing the particular laid-up pre-preg composite materials may be used.

The invention also provides a composite component comprising:

a first layer of pre-preg composite material;

a second layer of pre-preg composite material, the second layer having an edge;

wherein the first and second layers form adjacent layers of the composite component, and wherein the edge of the second layer is adjacent a surface of the first layer;

wherein the ply drop at the edge of the of the second layer has been smoothed.

Example methods according to the invention will now be described with reference to the accompanying Figures, in which:

FIG. 1b is a section view along b-b in FIG. 1a;

FIG. 1c is a further perspective view of the workpiece and apparatus of FIG. 1a;

FIG. 4c is a plan view of the effect of a method according to the present invention on the workpiece of FIGS. 4a and 4b;

Figure 1A:
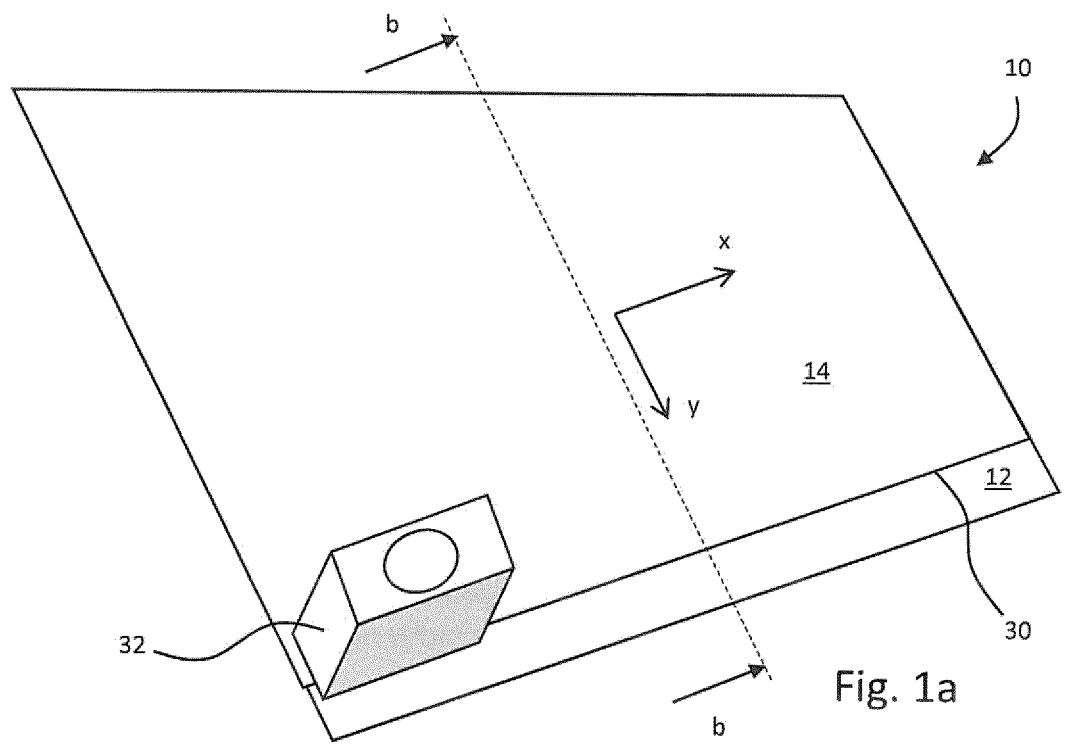
FIG. 1a is a perspective view of a workpiece and an apparatus configured to carry out a first embodiment of a method according to the present invention.

Referring to FIG. 1a, there is shown a workpiece 10 constructed from a first layer 12 and a second layer 14 of pre-impregnated composite material. Each layer 10, 12 comprises a mat of several sub-layers of non-woven carbon fibre material impregnated with an uncured resin matrix. Final curing has not taken place, and as such the workpiece 10 retains a degree of flexibility, with the fibres being mobile in the matrix.

The layers 12, 14 are aligned to an X-Y plane, with Z being the out-of-plane (thickness) direction.

The first layer 12 has a first surface 16, a second surface 18 and an edge 20. The second layer 14 has a first surface 22, a second surface 24 and an edge 26. The edges 20, 26 are not aligned, in other words the edge 26 of the second layer 14 terminates at a position offset from the edge 20 of the first layer 12, and adjacent to the first surface 16 of the first layer 12.

This creates a "ply drop" 30, i.e. an abrupt step from the first surface 22 of the second layer 14 to the first surface 16 of the first layer 12. This is the feature which the present invention seeks to mitigate.

Figure 1B:
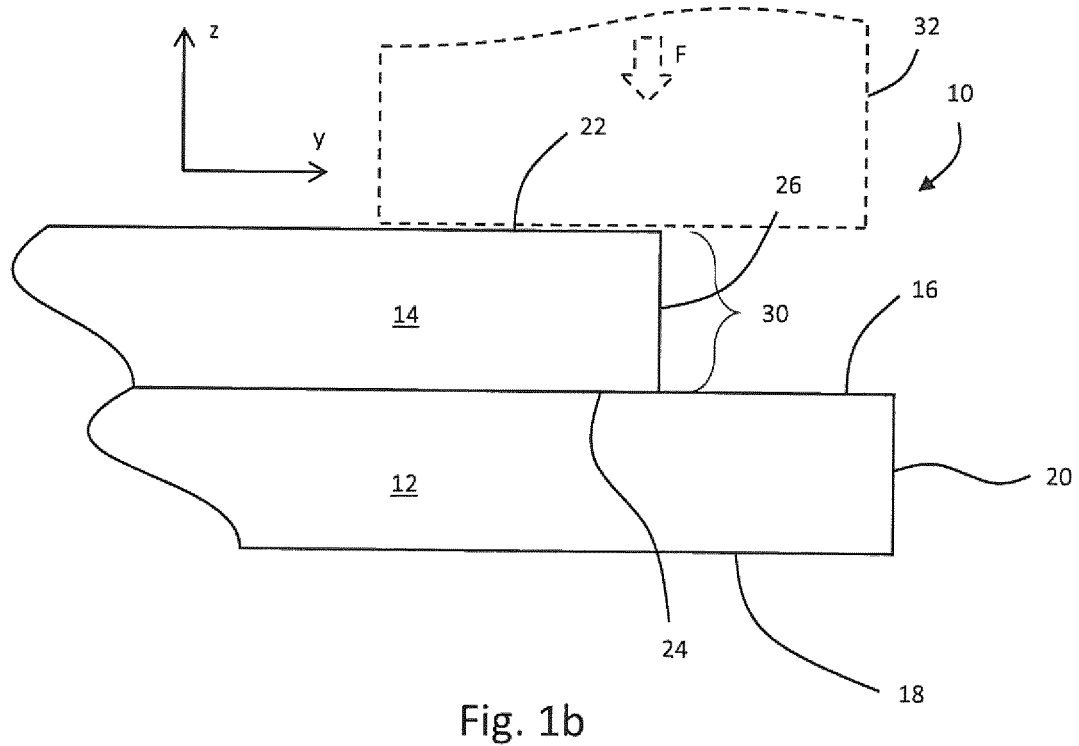

As shown in FIG. 1a, an ultrasonic transducer 32 is provided which is configured to emit ultrasonic energy (specifically 20 kHz) in the −Z direction (i.e. towards the workpiece 10). According to the invention, the transducer 32 is placed into contact with the workpiece 10 (as shown in hidden line in FIG. 1b) at the ply drop 30 and a force F applied in the −Z direction. An intermediate layer (not shown) may be present between the ultrasonic transducer 32 and the upper surface of the second layer 14, such as a sheet of siliconized paper. The transducer 32 is activated to transfer pressure and ultrasonic energy to the second layer 14 proximate the edge 26, and preferably at the edge 26. The time over which the ultrasonic energy is applied may be adjusted based on the area of the transducer head and the rate of energy transfer. This has the effect of spreading/splaying the fibres of the second layer 14 to reduce the local thickness and to therefore spread out, or "smooth", the ply drop 30.

Figure 1C:
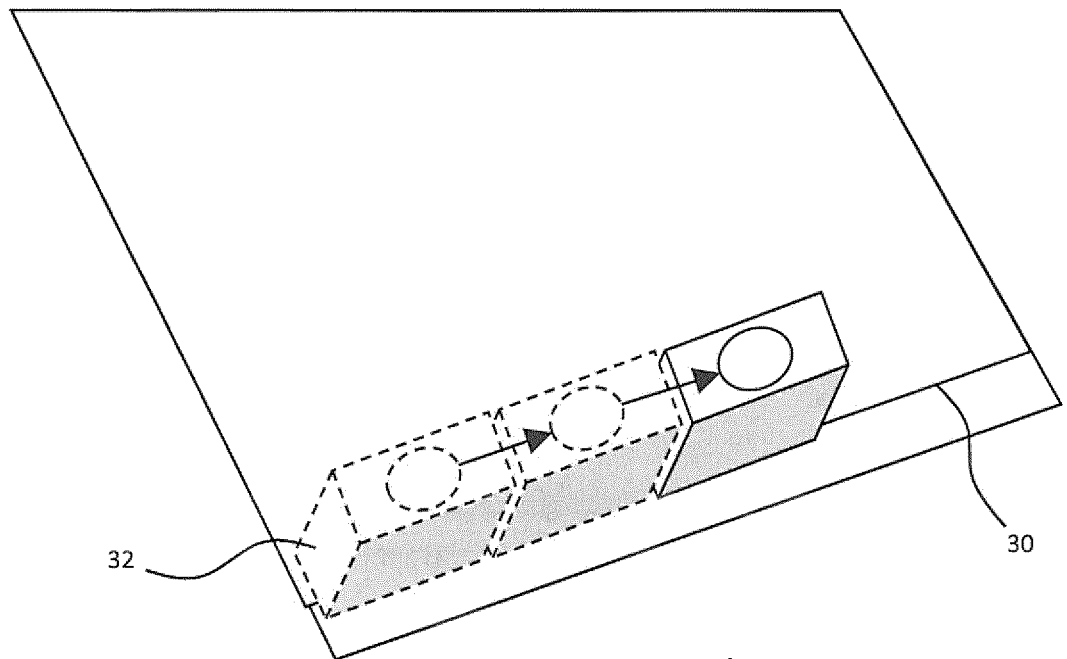

The transducer 32 can be incrementally moved along the width of the ply drop 30 (FIG. 1c).

Figure 2:
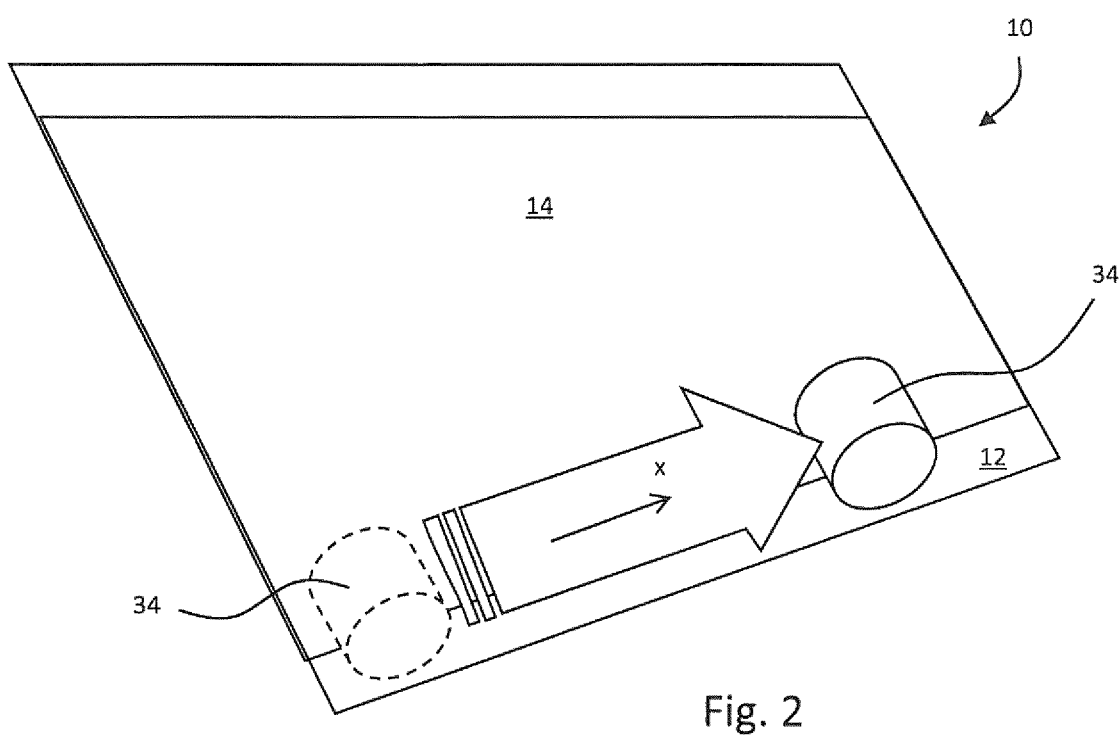
FIG. 2 is a perspective view of a workpiece and an apparatus configured to carry out a second embodiment of a method according to the present invention.

Referring to FIG. 2, the workpiece 10 is shown with an alternative ultrasonic transducer 34. The transducer 34 is rotational, and as such can remain in contact with the workpiece 10, applying a force to the ply drop 30 as it moves in the X direction.

Figure 3A:
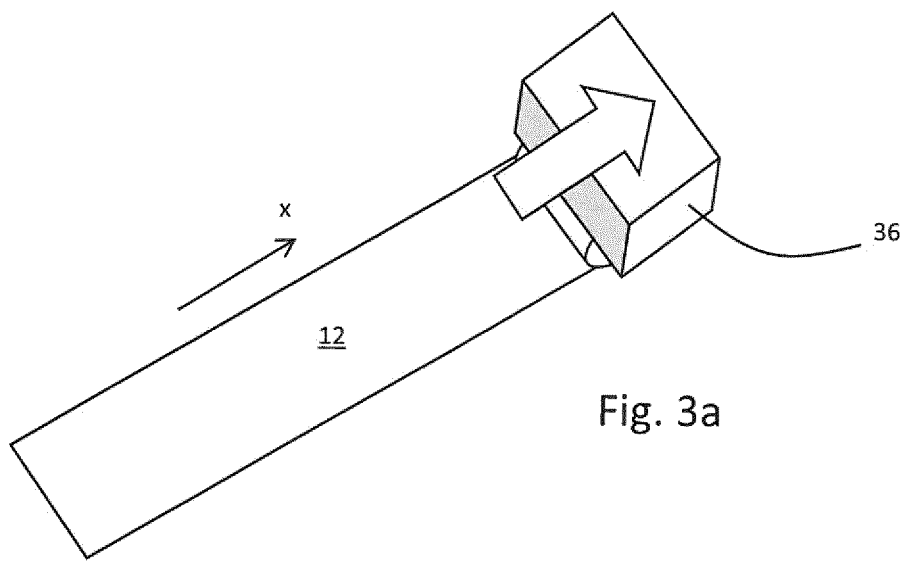
FIGS. 3a to 3c are perspective views of a third embodiment of a method according to the invention.
Figure 3B:
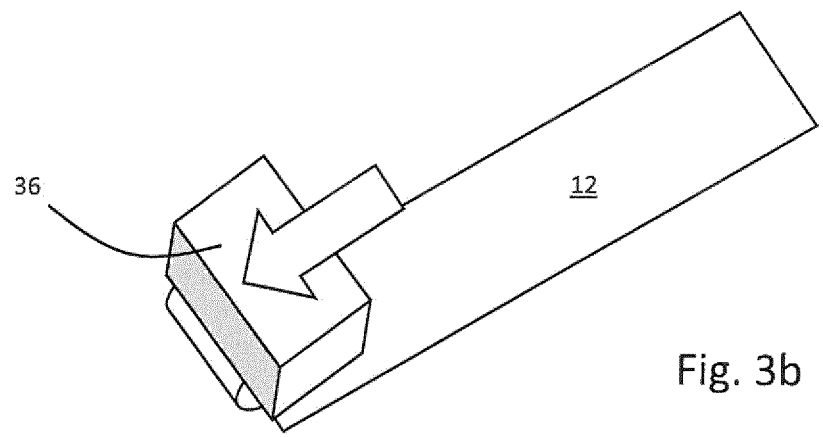
Figure 3C:
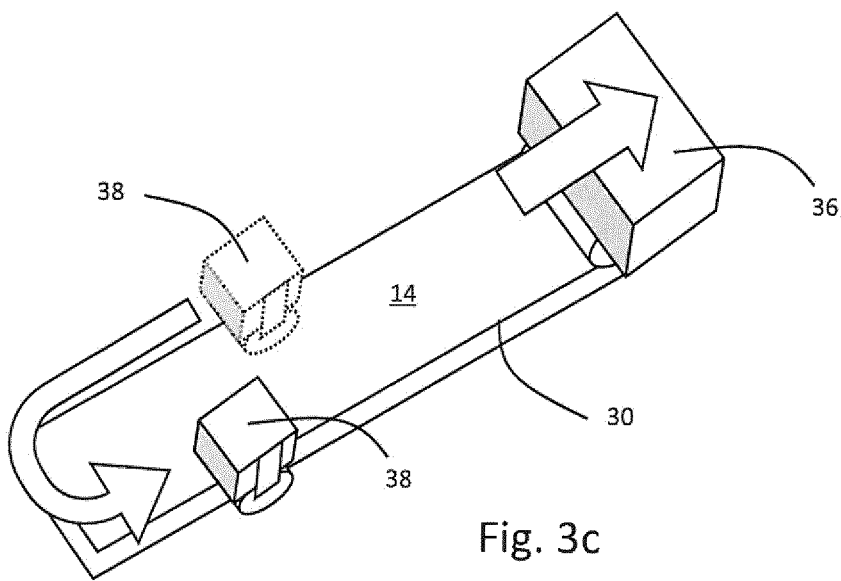

Referring to FIGS. 3a to 3c, an automated layup and process according to the invention is shown. In FIG. 3a, an automatic tape laying (ATL) head 36 is provided, which is configured to deposit prepreg material. The ATL head 36 deposits a first layer 12 in the +X direction. The ATL head finishes depositing the first layer 12 and returns in direction −X without depositing, as shown in FIG. 3b. Moving from FIGS. 3b to 3c, the head 36 completes a further deposition run, depositing a second layer 14 of prepreg. A ply drop 30 is defined between the first and second layers 12, 14 per FIGS. 1a to 2.

A mobile ultrasonic transducer 38 is provided which is configured to follow behind the ATL head 36 and to provide pressure and ultrasonic energy transfer to the ply drop 30 as with the previous embodiments.

In each of the above embodiments, it is preferable that the edge 26 defining the ply drop 30 is configured in a certain way. In the following embodiments, various edges 26 are described, each of which may be employed in any of the above-described processes.

Figure 4A:
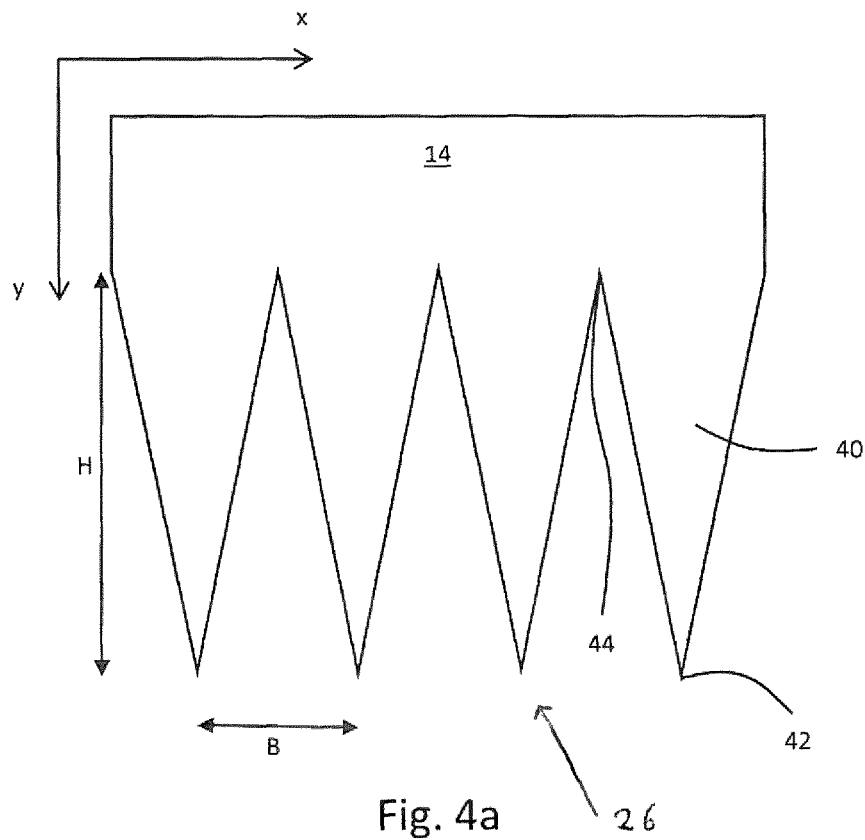
FIGS. 4a and 4b are views of part of a composite material suitable for use in a method in accordance with the present invention.
Figure 4B:
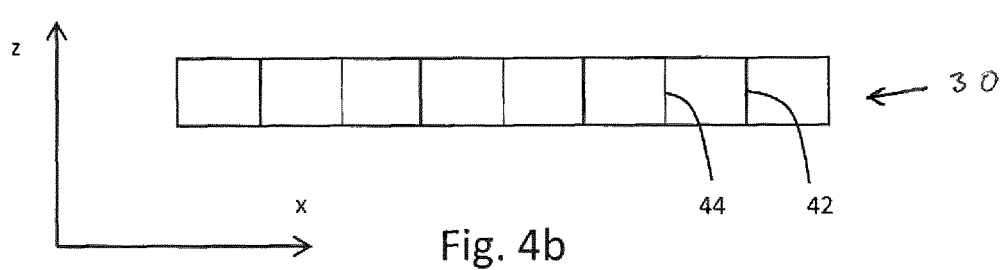

Referring to FIG. 4a, the layer 14 is shown having edge 26 defining a ply drop 30 per the above embodiments. The edge 26 is undulating in the X-Y plane. In this embodiment, the edge 26 describes a repeating triangular formation comprising a plurality of adjacent, identical, triangular regions 40. This results in a series of peaks 42 and troughs 44. Each region has a "height" in the Y direction of H, and a "base" in the X direction of B (between peaks). In this embodiment, H=20 mm and B=6 mm. Force and ultrasonic energy is applied across the Y length of the formation, for example by a mobile ultrasonic transducer 38 (as shown in FIG. 3c) progressing in the X direction. As the force and ultrasonic energy is applied, the fibres within the layer 14 displace and spread. FIG. 4c shows the fibre part of the layer 14, and how it reacts to ultrasonic energy and force input. It progresses from an undeformed state S1 through stages S2, S3, S4 to a deformed state S5 as the force and pressure is applied.

Figure 4D:
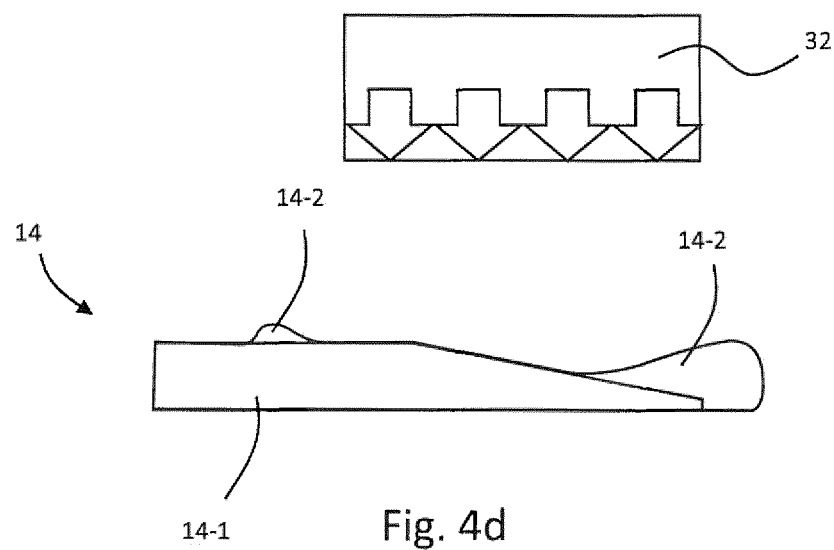
FIG. 4d is a section view of the end stages of FIG. 4c.

Referring to FIG. 4d, a section view of the layer 14 is shown, corresponding to stage S5 in FIG. 4c. In FIG. 4d, both the fibre component 14-1 and matrix component 14-2 are shown. The transducer 32 is also shown. The fibres 14-1 have spread (per FIG. 4c) providing a taper, but the polymer matrix has flowed to create two regions or "bumps" on either side of the transducer 32. This will be discussed further below.

Referring to FIGS. 5a to 5g, various results of experiments applying the present invention are shown.

Figure 5A:
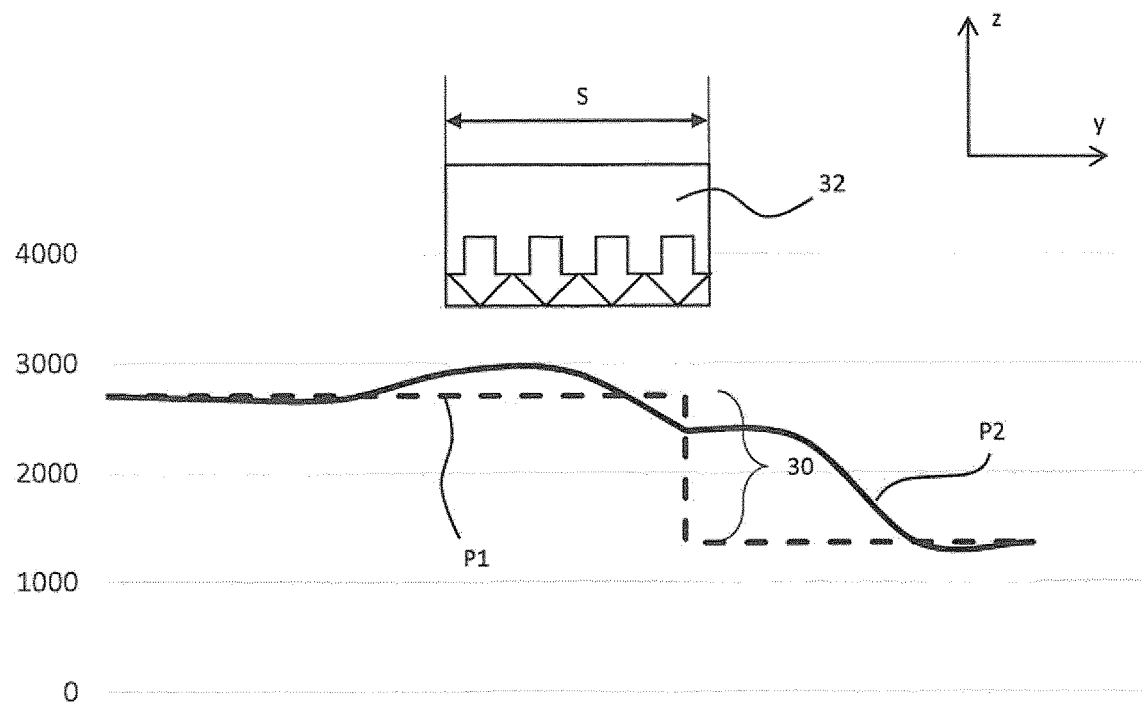
FIGS. 5a to 5g are views of results of methods according to the invention.

FIG. 5a shows a starting profile P1 (dashed line) of an undeformed ply drop 30 which has a thickness of 1.35 mm and a straight edge profile. In this case the material is multiaxial glass pre-preg (0°/+45°/−45°). The ply drop 30 has been subjected to the application of force and ultrasonic energy from the transducer 32 per FIGS. 1a to 1b. The vertical axis represents Z thickness in microns. The force and energy is applied over a sonotrode width S in the Y direction (which in this embodiment is 23 mm). The sonotrode had an area of 10,750 mm². It is to be noted that the sonotrode width S overlaps the ply drop 30. The sonotrode was provided with 1600 N force in the −Z direction, resulting in a pressure of 150 kPa over the area of the sonotrode, and 1000 J energy (converted to ultrasonic energy), over a time period of 1 seconds, resulting in an energy transfer of 95 k/Wm².

The profile P2 shows the deformed YZ section through the layup. As can be seen, the otherwise severe ply drop has been softened, however the transition remains significant. It is to be noted that resin flow either side of the sonotrode 32 (both in the +Y and −Y directions) has produced an uneven or "bumpy" profile P2.

Figure 5B:
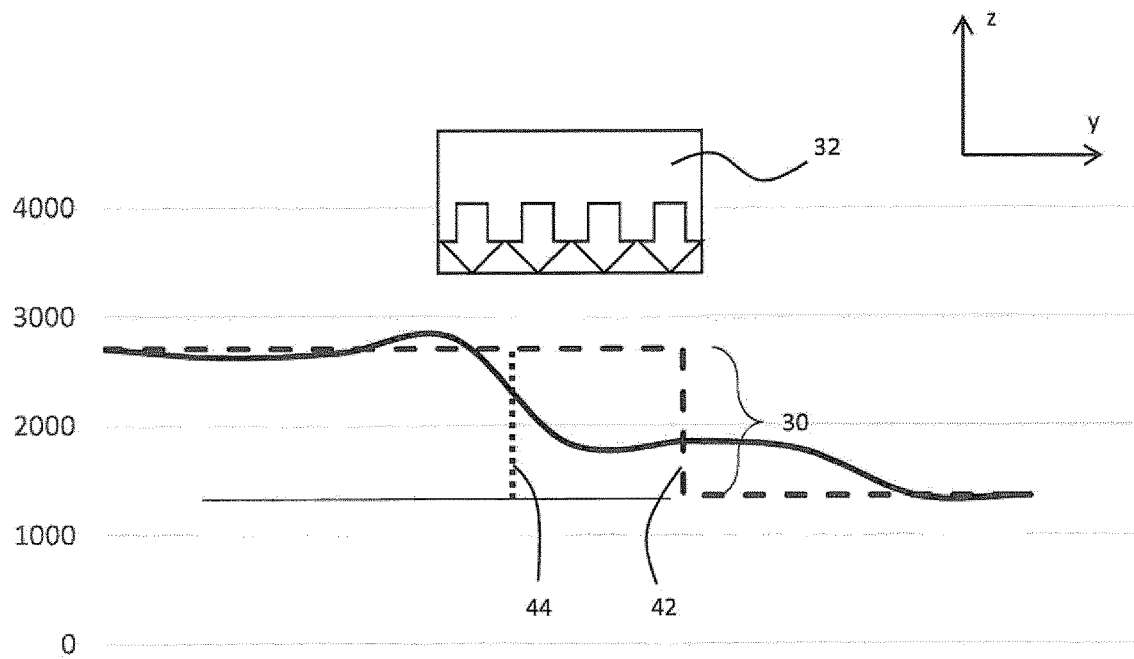

FIG. 5b shows a starting profile P1 with an undulating or oscillating edge at the ply drop 30. It will be noted that the sonotrode 32 overlaps both the peaks 42 and troughs 44 (i.e. the entire height H of the formation). The sonotrode, force and ultrasonic treatment are the same as for FIG. 5a. The profile P2 shows the deformed YZ section through the layup. As can be seen, the otherwise severe ply drop has been softened, and the transition is smoother than that of FIG. 5a. This is a result of the lateral "spreading" effect described with reference to FIG. 4c. It is to be noted that some resin flow either side of the sonotrode is still visible.

Figure 5C:
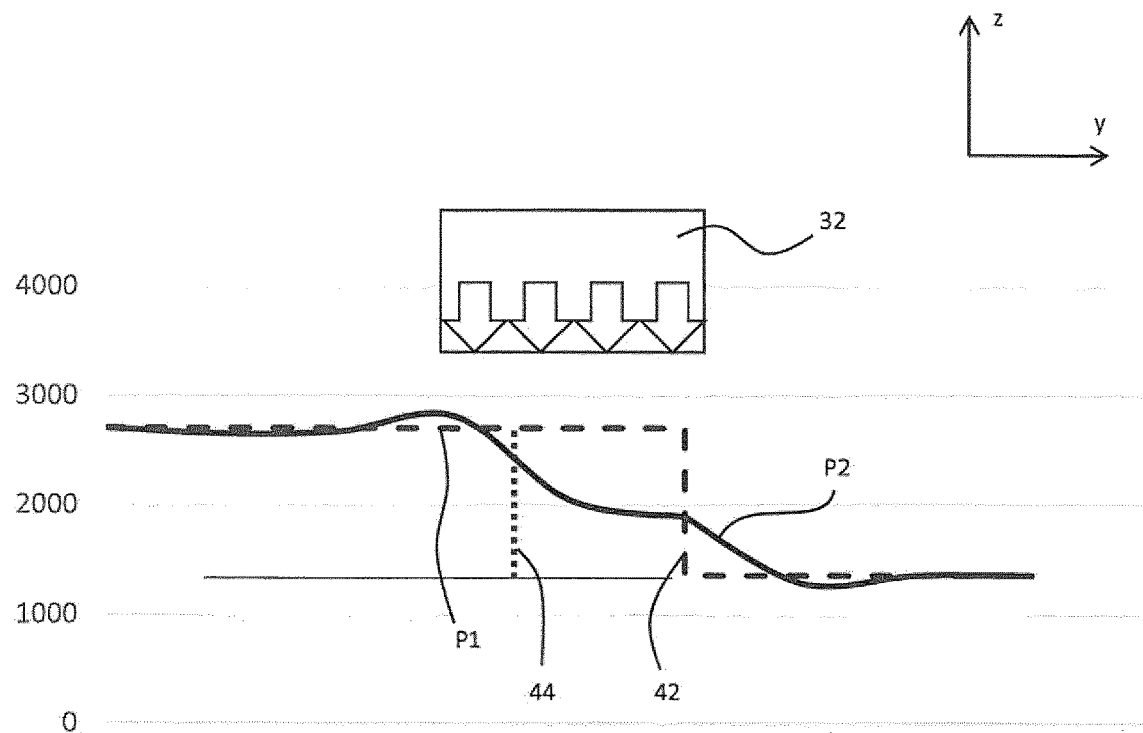

FIG. 5c is identical to the test of FIG. 5b, but the ultrasonic energy has been dropped from 1000 J to 750 J.

Figure 5D:
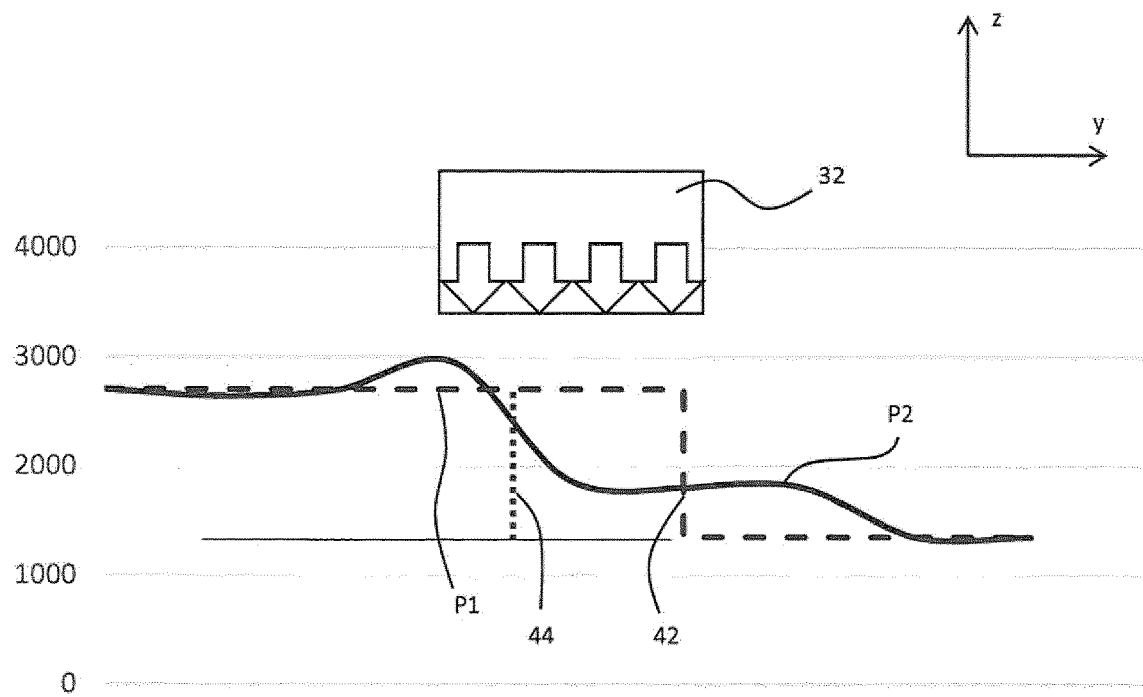

FIG. 5d is identical to the test of FIG. 5b, but the force has been decreased from 1000 N to 200 N, and the ultrasonic energy has been increased from 1000 J to 2000 J. Resin flow is more pronounced than in FIG. 5c.

Figure 5E:
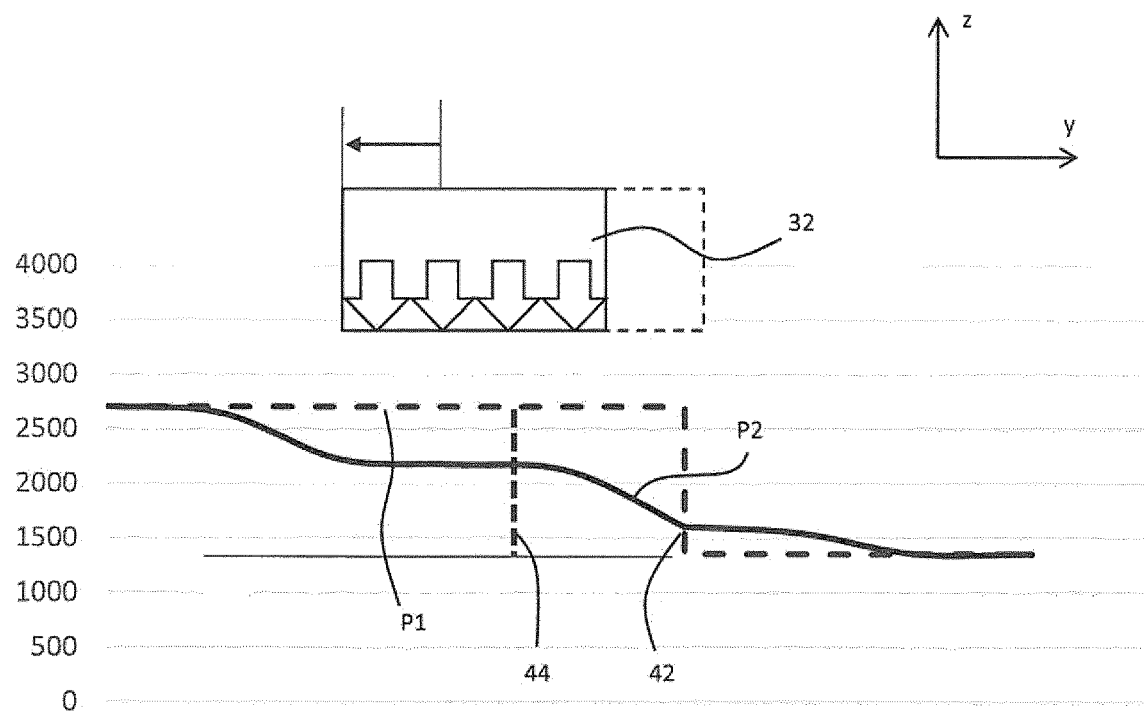

FIG. 5e is representative of a test identical to FIG. 5d, but a second dose of force and energy has been applied sequentially, and after the first. For the second dose, the sonotrode has been moved from the initial position (dashed line) in the −Y direction to a further position which overlaps only the troughs 44. The second dose of force and ultrasonic energy is identical to the first (200 N/2000 J). The "bump" which developed in the −Y direction behind the sonotrode 32 in FIG. 5d has been smoothed out, and the profile of FIG. 5e is a significant improvement thereon.

Figure 5F:
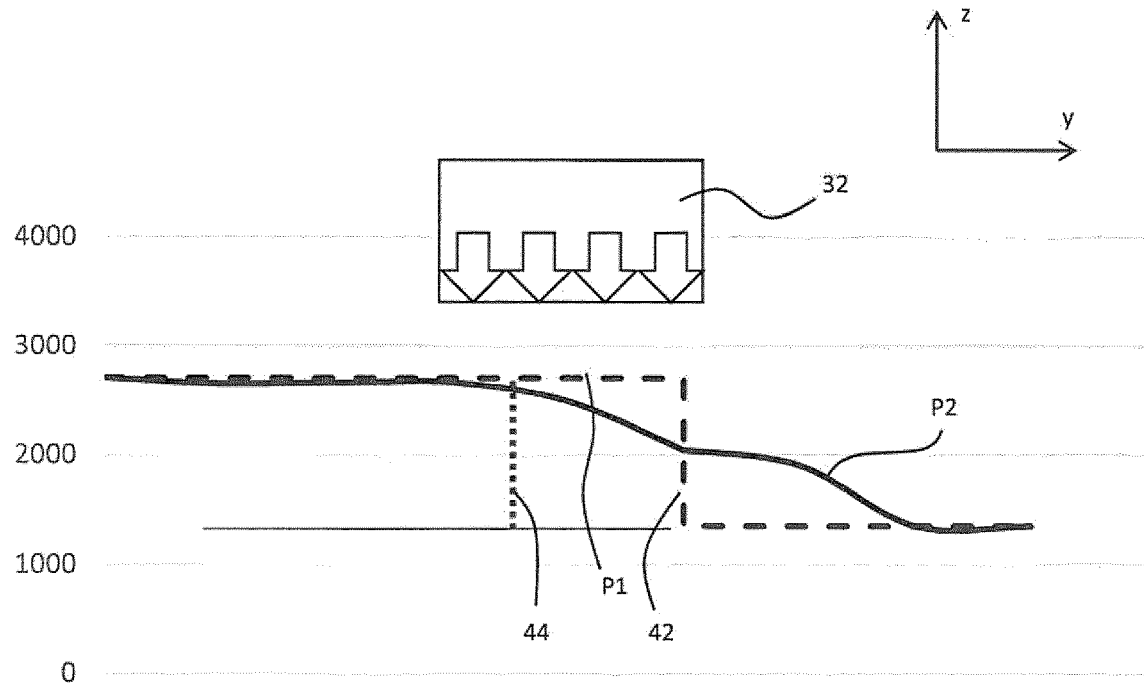

FIG. 5f is identical to the test of FIG. 5b, but the force has been decreased from 1000 N to 500 N, and the ultrasonic energy has been decreased from 1000 J to 500 J. There is minimal resin flow behind the sonotrode at this level. There was also limited lateral displacement and "spreading" of the fibres.

Figure 5G:
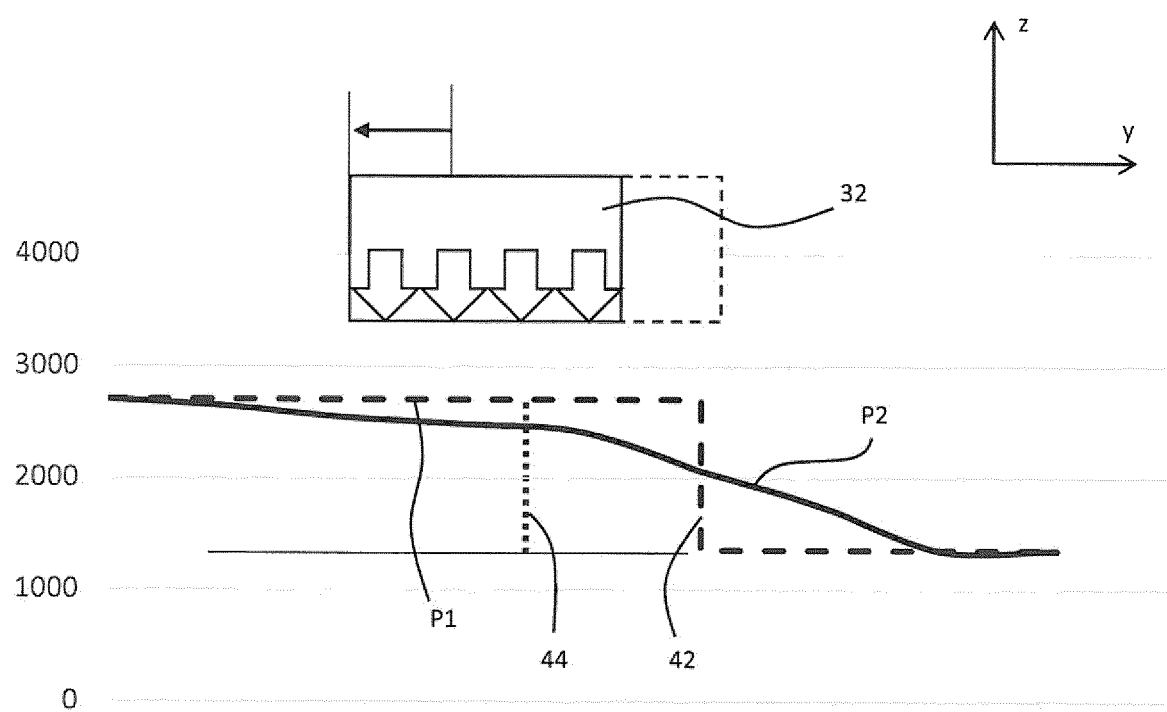

FIG. 5g is a repeat of FIG. 5f, but with a second dose of force and energy applied sequentially, and after the first. For the second dose, the sonotrode has been moved from the initial position (dashed line) in the −Y direction to a further position which overlaps only the troughs 44. The second dose of force and ultrasonic energy is identical to the first (500 N/500 J). The "bump" which developed in the −Y direction behind the sonotrode 32 in FIG. 5f has been smoothed out, and the profile of FIG. 5g is a significant improvement thereon.

Figure 6A:
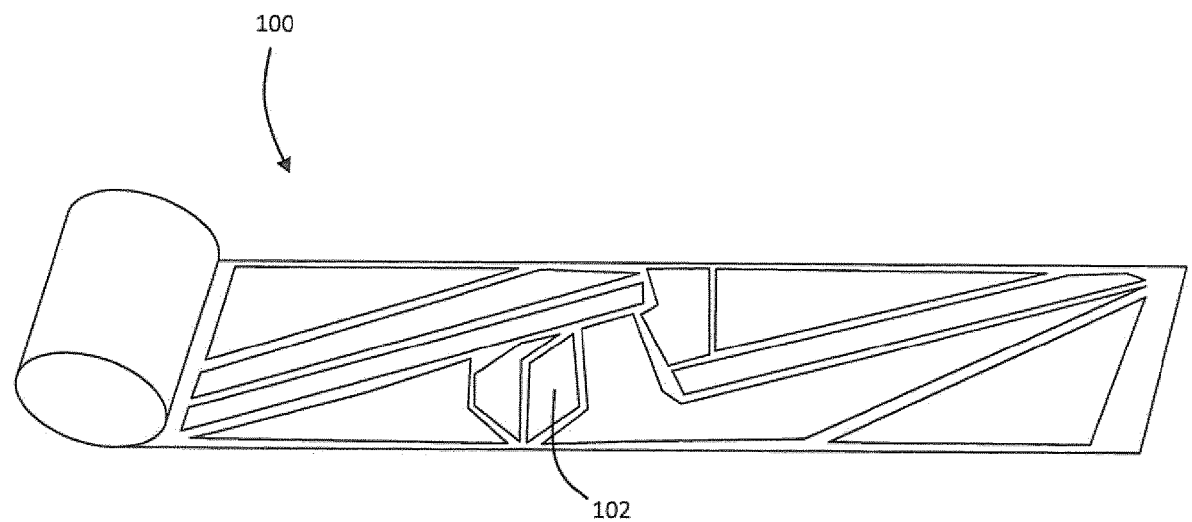
FIG. 6a is a perspective view of an example of conventional nesting of pre-preg plies within a pre-preg sheet.
Figure 6B:
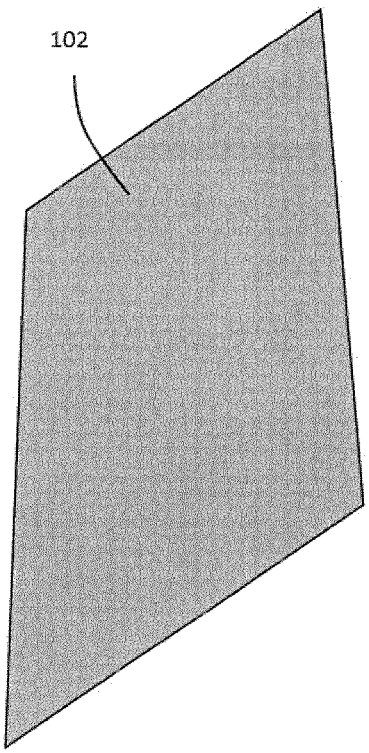
FIG. 6b is a perspective view of a traditionally formed coupon from the sheet of FIG. 6a; and, FIG. 6c is a perspective view of a coupon formed from the sheet of FIG. 6a having a shaped edge suitable for use in a method in accordance with the invention.
Figure 6C:
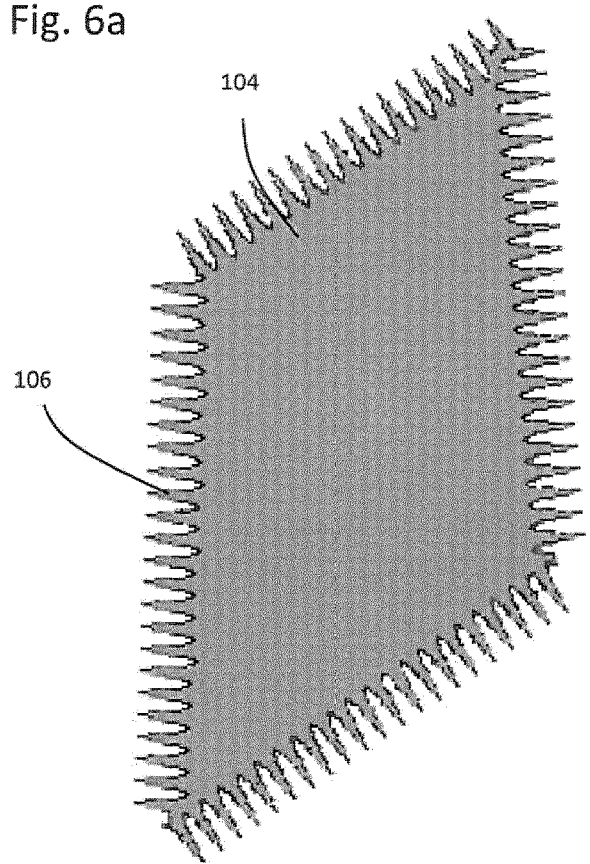

FIG. 6a shows a sheet 100 of pre-preg material which has various coupons 102 marked for cutting out, to be used in a lay-up. FIG. 6b shows a coupon with straight edges (as known in the art), but FIG. 6c shows a coupon 104 with undulating edges 106 e.g. like FIG. 4a.

Variations to the above embodiments fall within the scope of the present invention.

The invention claimed is:

1. A method of joining together multiple layers of pre-preg, comprising the steps of:
    providing a first layer of pre-preg, said layer having a surface and a plurality of edges;
    providing a second layer of pre-preg, the second layer having a surface and a plurality of edges;
    laying-up the first and second layers of pre-preg such that an edge of the second layer is adjacent a surface of the first layer of pre-preg, but such that the edges of the first and second layers of pre-preg do not terminate in the same place, the difference in positioning of said edges forming an edge drop; and
    applying pressure and vibrational energy to the edge of the second layer of pre-preg to thereby smooth the ply drop at the edge of the second layer of prepreg; wherein the step of applying pressure and vibrational energy to the edge of the second layer is carried out at a first position and wherein the method comprises a further step of applying pressure and vibrational energy to the second layer at a second position, the second position being offset in a direction normal to the edge of the second layer with respect to the first position; wherein the pressure applied is between 20 kPa and 500 kPa; and wherein
the second layer defines an undulating formation having a plurality of protrusions having triangular or curved edges.

2. The method according to claim 1, wherein the fibres of the second layer of pre-preg are unidirectional, multi-axial or in the form of a non-crimped fabric.

3. The method according to claim 2, wherein the method additionally comprises:
    after the step of laying-up the first and second layers of pre-preg but before applying pressure and any vibrational energy to the edge of the second layer, providing one or more additional layers of pre-preg;
    laying-up one of the additional layers of pre-preg on the second layer of pre-preg such that the edge of the additional layer is adjacent a surface of the second layer of pre-preg; and
    separately applying pressure and vibrational energy to each of the edges of the pre-preg to thereby smooth the ply drop formed at each of the edges.

\* \* \* \* \*